United States Patent [19]

Eichelberger et al.

[11] 3,806,891

[45] Apr. 23, 1974

[54] LOGIC CIRCUIT FOR SCAN-IN/SCAN-OUT

[75] Inventors: Edward B. Eichelberger, Purdy Station; Richard N. Gustafson, Hyde Park; Clark Kurtz, Highland, all of N.Y.

[73] Assignee: International Business Machines Corporation, Armonk, N.Y.

[22] Filed: Dec. 26, 1972

[21] Appl. No.: 318,344

[52] U.S. Cl. ..... 340/172.5, 307/221 R, 340/173 FF

[51] Int. Cl. .......................... G06f 3/00, G11c 19/00

[58] Field of Search ..... 340/172.5, 173 FF, 173 RC; 307/221 R

[56] References Cited

UNITED STATES PATENTS

| | | | |
|---|---|---|---|
| 3,582,902 | 6/1971 | Hirtle et al. | 340/172.5 |
| 3,631,402 | 12/1971 | Field | 340/172.5 |
| 3,651,472 | 3/1972 | Holtey | 340/172.5 |

*Primary Examiner*—Paul J. Henon
*Assistant Examiner*—Melvin B. Chapnick
*Attorney, Agent, or Firm*—Robert W. Berray

[57] ABSTRACT

A generalized and modular logic circuit for arithmetic/logical units of a digital computer, adaptable to large scale integration (LSI) manufacturing techniques. Each logic circuit includes combinational logic networks which provide inputs to storage circuitry. The storage circuitry is sequential in operation and employs clocked dc latches. Out-of-phase clock trains are used to control the latches. With each storage circuit, there is provided additional circuitry for providing an input which is independent of the combinational logic network. A logic unit comprised of a plurality of the logic circuits is constructed to interconnect the output of a storage circuit to the independent input of another logic circuit so that each latch acts as one position of a shift register having inputs/outputs independent of the system inputs/outputs.

5 Claims, 4 Drawing Figures

LOGIC CIRCUIT FOR SCAN-IN/SCAN-OUT

BACKGROUND OF THE INVENTION

1. Field of the Invention

This invention relates to logic systems for use in general purpose digital computers and, more particularly, to an organization of a logic circuit in such systems to render it responsive to test data and operable to effect scan-in and scan-out.

2. Description of the Prior Art

In the past, the designer of computer logic has had complete flexibility in arranging logic circuitry to implement system and sub-system logic functions in central processing units, channels and control units employed in digital computing apparatus. A significant variety of design implementations has resulted from the exercise of this flexibility. Each of these implementations has its own special dependency on the ac characteristics of the individual circuits employed in the system.

The independence and flexibility characterizing the arrangements of the designer often led to unexpected system timing problems, complicated and complex problems in testing the circuitry, and a significant complexity and detail required for educating the field service personnel for such computing systems. However, it had the advantage of permitting the designer to use all techniques to obtain the best performance by employing the fewest number of circuits. The interface between the logic designer and the component manufacturer was reasonably well defined and the approach of the past could be supported in component manufacturing since the ac parameters such as rise time, fall time, individual circuit delay, etc., could rather readily be tested.

With the advent of large scale integration, however, this well defined and reliably tested interface no longer exists. It has become impossible or impractical to test each circuit for all of the well known ac circuit parameters. As a result, it is necessary to partition and divide logic systems and sub-systems into functional units having characteristics that are substantially insensitive to these parameters. Large scale integration provides the ability for the logic designer as well as the component manufacturer to utilize the capacity for placing hundreds of circuits on a single chip of semiconductive material. Such an ability offers the potential for reducing power, increasing speed, and significantly reducing the cost of digital circuits.

Unfortunately, a number of serious considerations are involved before this potential can be achieved. For example, in a medium sized computing system having approximately 40,000 individual circuits, it has not been uncommon to effect 1,500 or more engineering changes during the development period for the product. It is readily apparent that the implementation of such a significant number of engineering changes approaches the impossible when dealing with the lowest level modular unit of a computer which has hundreds of circuits contained within it.

Another area which must be considered as technology moves into the fabrication of large scale integrated functional units is the product testing required prior to its incorporation into a computing system. The subsequent diagnostic tests performed during field servicing as well as the simulation that is performed during design and manufacturing are factors for consideration in fabricating such functional units.

In the past, each individual circuit has been tested for the usual and normal ac and dc parameters. Access to the modular unit for applying the input test conditions and measuring the output responses has been achieved through a fixed number of input/output connection pins. However, in the realm of large scale integrated functional units, the same number of input/output pins are available, but there is considerably more circuitry;

Thus, in a typical module containing one hundred chips each having up to six hundred circuits with a three hundred circuit average, the module would contain at least 30,000 circuits. Parametric testing of such a unit is not possible. If functional tests are attempted on such a unit, having the prior art logical design configurations, the extent of coverage of testing would be significantly low and the level of reliability for use in a computing system would also be significantly low. Accordingly, provision must be made for eliminating the dependencies of the past. Current logical systems must be avoided and new logic organizations must be utilized in computing systems if the advantages of large scale integration are to be optimized. Testing must be performed in a functional manner on these new logical units, be it at the chip level, the module level, or other level. This testing is accomplished by automatically generating tests that assure the proper operation of every logic element in the unit.

As contrasted with the above prior art organizations and systems of logic, the logic system of copending Application Ser. No. 297,543, entitled "Level Sensitive Logic System" by E. B. Eichelberger, Filed Oct. 16, 1972 and assigned to the assignee of this invention, generalized a logic circuit and made it applicable to all levels of the hierarchy of modular units. The generalized logic systems have a single-sided delay dependency, avoid all race conditions and hazards and eliminate the normal and usual ac timing dependencies. The functional logical units are made solely dependent on the occurrence of the signals from plural system clock trains. This is accomplished by using clocked dc latches for all internal storage circuitry in the arithmetic/logical units of the computing system. This latch circuitry is functionally partitioned along with associated combinational logic networks and arranged in sets. The plural clock trains are synchronous but non-overlapping and independent. The sets of latch circuitry are coupled through combinational logic to other sets of latches that are controlled by other system clock trains or combinations of clock trains. One of the ways to accomplish this objective is to use a different system clock for each one of the sets of latch circuitry.

The logic system of the above cited copending application incorporates another concept, aside from the single-sided delay dependency giving hazard and race-free operation. It provides for each latch circuit to include additional circuitry in the form of an additional latch so that each basic latch can be made to function as a shift register latch having input/output and shift controls that are independent of the system clocks and the system input/outputs. All of these shift register latches are coupled together to form one or more shift registers. Each has a single input, a single output and shift controls.

With this additional circuitry, all of the system clocks are de-activated, isolating all of the latch circuits from one another, permitting a scan-in/scan-out function to be performed. The effect is to reduce all of the sequential circuitry to combinational circuitry which is partitioned down to the level of multistage combinational networks. This permits automatic test generation to be performed for testing each circuit in the entire logical unit.

SUMMARY OF THE INVENTION

A logic circuit is disclosed in this invention which incorporates, as a basic logic circuit, any desired form of a combinational logic network which receives a plurality of system logic signals for combination, the results of which are then provided to circuit means which register or store the logic network result and provide an output indication. The output of the registering means is provided as an input to another combinational logic network or reapplied to the same combinational logic network which produced the result stored. Independent means for providing an input to the circuit means for registering is utilized to enter binary data into the circuit means independent of the combinational network. By interconnecting the circuit means of a plurality of the logic circuits on a logic module, and utilizing the independent input means of all of the logic circuit means, all the logic circuit means will then be interconnected in a shift register apparatus permitting any form of data to be entered into the interconnected logic circuits to provide test data. The output of the registering means of the last logic circuit will be presented as an output for all of the interconnected logic circuits such that the state of all of the registering means can be serially presented to this output as scan-out data. To preset all of the logic circuits in a particular logic module, scan-in data will be presented to the independent input means of the registering means of the first logic circuit of all of the interconnected logic circuits.

As mentioned previously, with regard to the above cited copending application, one form of logic circuit shown therein requires additional circuitry to be provided in the form of a dc, clocked latch for each other latch in the logic module in order to incoporate the above recited shift register action. Further, the above cited copending application requires, in addition to the independent input for scan-in data, a separate shift register clock in addition to the clocks utilized in a normal system operation. Further, a requirement of the above cited copending application is that any latch in the circuit which feeds an input to another latch must be controlled by non-overlapping clocks.

It is a basic feature of the present invention that a standard logic circuit arrangement is provided comprised of, in sequence, a combinational logic network, a first bistable storage device, and a second bistable storage device. This basic configuration, with an additional independent input to the first bistable device provides the capability of scan-in/scan-out for all of the logic circuits of a larger LSI logic module utilizing the above cited shift register techniques. It also provides a logic circuit in which the scan operations, which utilize the interconnected shift register configuration, does not require separate clock sources and therefore reduces the number of terminals required at the input of a logic module. Further, the basic logic circuit can be readily adapted to systems in which it is desired to operate the logic circuits with either a single clock, in which two opposite phases are utilized, or a system which utilizes two separate clocks which have non-overlapping phases.

DESCRIPTION OF THE PREFERRED EMBODIMENT

Figures 1, 2:
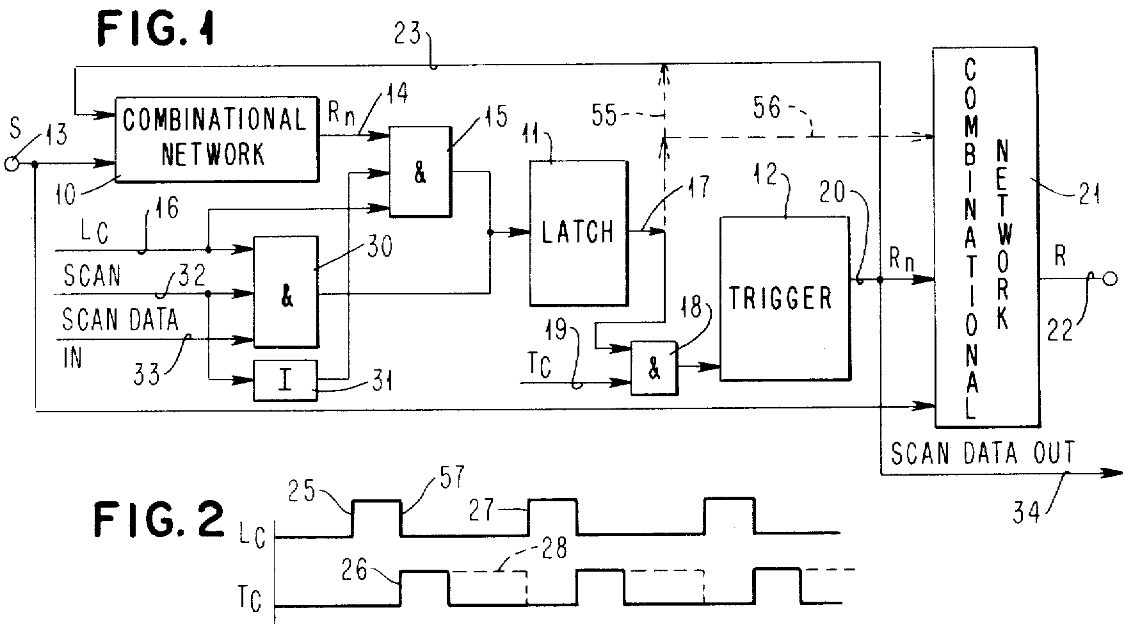
FIG. 1 is a schematic diagram of the organization of a basic logic circuit embodying the principles of the invention.
FIG. 2 is a timing diagram of the system clock employed with he logic circuit of FIG. 1.

In FIG. 1 there is shown a block diagram of the basic logic circuit of the present invention. In the design of a data processing system having thousands of logic functions to be performed, large scale integration (LSI) provides semi-conductor circuit chips having hundreds or thousands of the basic logic circuit shown in FIG. 1. The basic logic circuit represents a single binary bit position of system logic, and is comprised of a combinational logic network 10, a first bistable device 11, and a second bistable device 12. The bistable devices 11 and 12, when considered together, represent circuit means for registering and manifesting a single binary bit of system information.

The two bistable devices are distinguished by labeling device 11 a latch and device 12 a trigger. This labeling identifies which of two out-of-phase clocks gates data to the device.

The logic network 10 may be any combination of parallel or sequential logic circuits which receive system inputs S on line 13. These signals represent one or more system signal lines providing gate, logic, or data results from other system logic. The result ($R_n$) of the logic performed by the logic network 10 is provided on an output 14 which is applied to an AND circuit 15. The basic logic circuit receives a latch clock signal train ($L_c$) on line 16 which is operative at AND circuit 15 to set latch 11 to the condition represented by the logic network output 14. The logic network result registered in latch 11 and provided on an output 17 is registered or stored in trigger 12 through an AND circuit 18. The other enabling input to AND circuit 18 is a trigger clock signal train ($T_c$) on line 19. The trigger clock signal train on line 19 is out-of-phase with respect to the latch clock signal train on line 16. That is, the rise of a clock signal on line 19 is sufficiently out-of-phase with the rise and operation of the latch clock signal train 16 to insure that the latch 11 has accurately registered the logic network 10 output 14 prior to the time the trigger 12 is rendered operative to register the same information.

The output of trigger 12, which now registers the logic network 10 result $R_n$, is provided on an output line 20. As shown in a further embodiment of the present invention, the output 20 of trigger 12 may be presented as an input to some subsequent combinational logic network 21 which in turn provides a result signal R on an output line 22. Further, the output 20 of trigger 12 may also be returned on a line 23 to the input of the combinational logic network 10, and enter into subsequent logic functions as directed by system signals on line 13.

Before completing a description of FIG. 1, the out-of-phase clock signal trains will be discussed with reference to FIG. 2. The frequency of the various clock signal trains, width of the bistable device setting pulse, and degree of phase difference between the various clock signal trains is a function of the time required to reliably set the bistable devices 11 or 12, and some maximum amount of delay encountered between the input of combinational network 10 and the output $R_n$ representing the result.

A logic designer may choose to control the basic logic circuits of the system with two separate clocks, each out-of-phase with the other as represented by the latch clock signal train $L_c$ and trigger clock signal train $T_c$. The amount of phase difference between the two clock signal trains, represented by the rise time 25 of $L_c$ and rise time 26 of $T_c$ is a function of the speed at which the latch 11 of FIG. 1 can be reliably set. The frequency of the two clock trains represented by the amount of time between the rise time 26 of $T_c$ and the rise time 27 of clock train $L_c$ is a function of the delay through the combinational logic network 10.

The logic designer of a system could choose to utilize a one clock system wherein the basic clock, such as $L_c$ would be inverted to provide an out-of-phase clock signal represented by the dotted line 28 of the $T_c$ clock signal train.

Returning now to a discussion of FIG. 1, the additions which must be made to the previously described basic logic circuit to permit the logic circuit to be interconnected in a shift register fashion with other logic circuits will be discussed. To accomplish this function, an independent input is provided for the latch 11 by means of an AND circuit 30 and an inverter 31. When, during the operation of the system, it is desired to enter and register data in latch 11 and trigger 12 from some source other than the combinational network 10, a SCAN control signal line 32 will be energized to represent scan operations. The data to be entered will be provided on a signal line 33 labeled SCAN DATA IN. The energization of signal line 32 representing scan operations will be effective through inverter 31 to disable the operation of AND circuit 15 and provide one enabling input to AND circuit 30. The latch clock signal train on line 16 will now be effective through AND circuit 30 to provide the means for setting latch 11 in accordance with the data presented on SCAN DATA IN line 33. By suitable control therefore, the system is placed in a scan mode of operation and control exerted over the data presented to latch 11 of the logic circuit shown in FIG. 1 to provide a starting point for further operation of the combinational network 10.

in order to permit selective examination of the contents of trigger 12, an additional output line 34 is provided to signal SCAN DATA OUT. A known data configuration can be entered through AND circuit 30 into latch 11, and thus trigger 12, by means of the SCAN control 32. The system can then be returned to normal system operation by lowering the SCAN line 32, permit a number of cycles of operation utilizing the combinational network 10, and then return to a scan mode by energizing line 32 and examine the contents of trigger 12 on the output 34.

Figure 3:
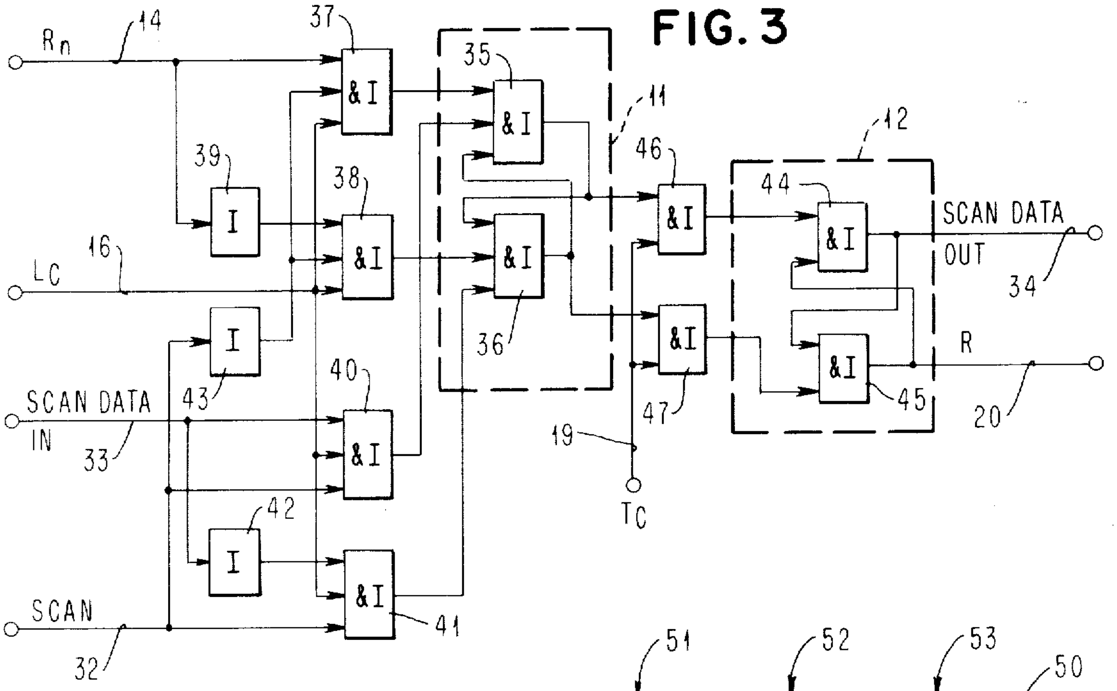
FIG. 3 is a logic diagram of the two bistable devices and input gates, which register and manifest the result of combinational logic shown in FIG. 1.

FIG. 3 is a more detailed logical diagram showing the latch 11, trigger 12, and clocked gating inputs. The circuit type used for logic is known as the AND Invert. The cross coupling of AND Invert circuits 35 and 36 comprise the latch 11. The output 14 of the combinational network 10 of FIG. 1 is supplied to an AND Invert 37 and to AND Invert 38 through an inverter 39. The latch clock train on line 16 provides the other inputs to AND Invert circuits 37 and 38 to normally cause the latch 11 to assume a binary 1 or binary 0 state dependent upon the output $R_n$ of the combinational network 10.

The independent input to latch 11, enabled by the control signal on SCAN line 32 is provided by AND Invert circuits 40 and 41, which receive as other conditioning inputs, the latch clock signal train 16 and the binary 1 or 0 state of SCAN DATA IN on line 33. Invert circuit 42 is an additional input to AND Invert circuit 41 such that AND Invert circuits 40 and 41 will cause the latch 11 to assume a binary 1 or binary 0 condition dependent upon the binary 1 or binary 0 state of the SCAN data on line 33. When the independent input to latch 11 is rendered effective by the SCAN control signal on line 32, Invert circuit 43 will be effective to disable or inhibit the functioning of AND Invert circuits 37 and 38.

Trigger 12 of FIG. 1 is comprised of AND Invert circuits 44 and 45 which receive as setting signals the outputs of AND Invert circuits 46 and 47. The enabling inputs to AND Invert circuits 46 and 47 are the binary 1 or binary 0 representation of the latch 11 and the trigger clock signal train on line 19. Line 34 from trigger 12 represents SCAN DATA OUT, and line 20 represents the manifestation of the combinational network output $R_n$ which has been registered and therefore manifested by the circuit arrangement including latch 11 and trigger 12.

Figure 4:
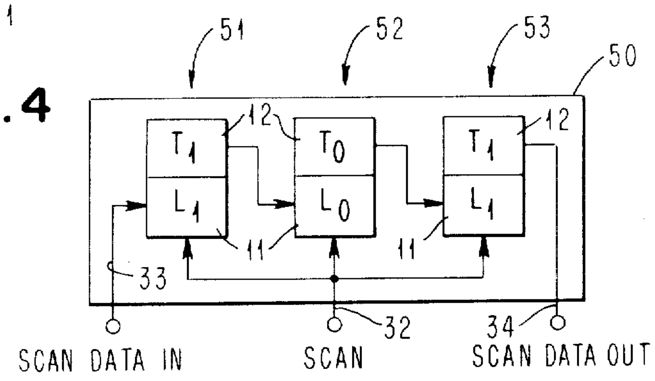
FIG. 4 is a symbolic illustration of the manner in which a plurality of basic logic circuits of FIG. 1 are interconnected on a single semiconductor chip to provide scan-in/scan-out.

FIG. 4 is a schematic representation of how a plurality of the basic logic circuits of FIG. 1 would be interconnected when combined on a single chip 50 of semiconductor material in the process of constructing an LSI circuit chip. The only additional signal lines which must be provided to the circuit chip, in additional to normal system inputs and system clocks, are the SCAN DATA IN line 33, the SCAN control 32, and the SCAN DATA OUT line 34. In constructing the chip 50, the plurality of latch 11 and trigger 12 circuits are interconnected in cascade fashion as shown. The SCAN DATA OUT line 34 from trigger 12 is connected to the SCAN DATA IN line 33 of a succeeding basic logic circuit latch 11. When the last of the latch 11-trigger 12 combinations has been interconnected into the cascade, the SCAN DATA OUT line 34 of the last trigger in the cascade will be taken to the output terminal of the chip. This output can then be connected to the SCAN DATA IN line 33 of another chip on a logic module. The independent input means to the latch 11 of the first basic logic circuit is connected to the SCAN DATA IN line 33 which enters scan data into all of the basic logic circuits on the chip 50.

In FIG. 4, the binary sequence 101 will be utilized to describe how the triggers 12 of the plurality of basic logic circuits on the ship 50 can be preset to the binary combination 101 during a SCAN operation prior to initiating a normal system operation utilizing these values as a starting point. To establish the pattern 101 as shown in FIG. 4, the binary bit pattern 101 will be presented serially on the SCAN DATA IN line 33 in synchronism with the latch clock signal train and trigger clock signal train to thereby shift the binary bit pattern through logic circuit 51, logic circuit 52, and logic circuit 53 in three cycles of operation. Subsequent to this time, normal system function can be established by removing the SCAN control signal on line 32 to establish normal system operation.

After a period of normal system operation, as determined by when the SCAN control line 32 is again energized, an operator can determine what the status of all of the latches 11 and triggers 12 of the plurality of logic circuits is at that time. When the SCAN control line 32 is energized, and the latch clock signal train and trigger clock signal train allowed to run, the contents of the logic circuits 53, 52, and 51 will be serially provided at the SCAN DATA OUT line 34.

Returning now to a discussion of FIG. 1, there is shown a modified form for the present invention wherein the same basic logic circuit can be adapted for a different form of clocking system. Alternate output lines 55 and 56 are shown from the latch 11. With this modification, normal system operation utilized only the latch 11 for providing an output to additional combinational networks 21 or for return as an input on line 23 to the combinational network 10. A signal clock system would be utilized in this embodiment such as that shown at $L_c$ in FIG. 2. Greater concern must be given to the amount of delay through the combinational network 10, as it relates to the frequency of the latch clock signal train, and the time between the rise 25 and fall 57 of each of the latch clock pulses utilized to set information into the latch 11. With close regard to the frequency of the latch clock signal train normal system operation can proceed as before. When it is desired to cause the basic logic circuit to function in a cascade shift register mode of operation for scan-in and scan-out, the AND circuit 30 will again be enabled and AND circuit 15 is disabled. In addition, however, an additional clock will be required like the trigger clock signal train $T_c$ on signal line 19 to thereby render trigger 12 effective in each of the basic logic circuits to enter into the shift register operation for scan-in and scan-out.

There has thus been shown a basic logic circuit including a combinational network feeding a storage circuit comprised of a first bistable device in the form of a latch and a second bistable device in the form of a trigger which can be adapted, by including an independent input to the first bistable device, to cause a plurality of logic circuits to be interconnected in a cascade fashion to permit shift register operations. When the plurality of logic circuits are enabled for shift register operation, predetermined patterns of binary data can be established in the storage circuitry of each of the logic circuits to control the starting point of operation of normal system functions. Further, enabling all of the logic circuits to function in a shift register fashion enables an operator to determine the contents of the storage circuitry for each of the logic circuits by sequentially accessing these contents through the shift register path to an output which will serially receive the sequence of binary data read from the logic circuits.

The above form of basic logic circuit, which permits the construction of combinational logic and storage circuits, can be rendered effective to perform shift register operations by utilizing the same clocks which are utilized in normal system operations, thereby eliminating the need to utilize input/output pins for this purpose in LSI construction. The shift register operation can be provided with only three I/O pins over and above normal system input, output and clocking.

What is claimed is:

1. A logic circuit for use in a data processing system, comprising:

at least one combinational logic network having system input means for receiving system logic signals and output means providing a network result signal;

plural out-of-phase clock signal trains;

circuit means including a first bistable device having input means and output means, said first bistable device input means being connected and responsive to said output means of said combinational logic network, and a first one of said plural out-of-phase clock signal trains for selectively registering and providing at said first bistable device output means, during each period of said one clock train, said network result signals, a second bistable device having input means and output means, said second bistable device input means connected and responsive to said first bistable device output means and a second one of said plural out-of-phase clock signal trains for registering and providing at said second bistable device output means, during each period of said second clock signal train, said network result signals; and independent scan data input means, coupled to said intput means of said first bistable device and said output means of said combinational logic network, including means for disabling said output means of siad combinational logic network, whereby said output means of said second bistable device provides an output signal manifesting scan data.

2. A logic circuit in accordance with claim 1 wherein:

said output means of said first bistable device is connected to said system input means of said at least one combinational logic network.

3. A logic circuit in accordance with claim 1 wherein:

said output means of said second bistable device is connected to said system input means of said at least one combinational logic network.

4. A logic circuit in accordance with claim 1 wherein there is provided:

an additional plurality of said combinational logic networks and an associated plurality of said circuit means and said independent input means;

means interconnecting in cascade from said output means of said second bistable device of all said circuit means except the last in the cascade to said independent input means of a succeeding one of said additional circuit means;

scan control signal means connected to all said independent input means to render said independent input means effective; and scan data output means connected to said output means of said second bistable device of said last circuit means in said cascade whereby, in response to said first and said second clock signal trains, the manifestations of all said circuit means are provided in sequence at said scan data output means.

5. A logic circuit in accordance with claim 1 wherein there is provided:

an additional plurality of said combinational logic networks and an associated plurality of said circuit means and said independent input means:

means interconnecting in cascade from said output means of said second bistable device of all said circuit means except the last in the cascade to said independent input means of a succeeding one of said circuit means;

scan control signal means connected to all said indepedent input means to render said independent input means effective; and scan data input means connected to said independent input means of the first of said circuit means in the cascade for sequentially receiving a binary bit pattern whereby, in response to said first and said second clock signal trains, the binary bit pattern is shifted through said circuit means to register and manifest in each said circuit means a particular binary bit of the pattern.

* * * * *